United States Patent
Baumgartner et al.

(10) Patent No.: US 8,943,062 B2
(45) Date of Patent: Jan. 27, 2015

(54) REAL-TIME DATA THRESHOLD GENERATION AND MONITORING

(75) Inventors: Jeffrey L. Baumgartner, Concord, CA (US); Eric W. Baumgartner, Concord, CA (US); Michael W. Monsey, Seattle, WA (US)

(73) Assignee: Cellco Partnership, Basking Ridge, NJ (US)

( * ) Notice: Subject to any disclaimer, the term of this patent is extended or adjusted under 35 U.S.C. 154(b) by 271 days.

(21) Appl. No.: 13/524,237

(22) Filed: Jun. 15, 2012

(65) Prior Publication Data

US 2013/0339356 A1 Dec. 19, 2013

(51) Int. Cl.
G06F 17/30 (2006.01)

(52) U.S. Cl.
CPC .... *G06F 17/30598* (2013.01); *G06F 17/30303* (2013.01)
USPC ........... 707/737; 707/706; 707/722; 707/736; 707/741; 707/748; 707/752; 707/754; 707/755; 707/756; 707/757; 707/758; 707/781; 709/224; 455/454

(58) Field of Classification Search
USPC ........ 707/706, 722, 736, 737, 741, 748, 752, 707/754–758, 781, 999.204; 709/224; 455/454

See application file for complete search history.

(56) References Cited

U.S. PATENT DOCUMENTS

| | | | |
|---|---|---|---|
| 6,169,724 B1 * | 1/2001 | Begum et al. | 370/216 |
| 2006/0230143 A1 * | 10/2006 | Ziegler et al. | 709/224 |
| 2008/0004035 A1 * | 1/2008 | Atkins et al. | 455/454 |
| 2009/0075648 A1 * | 3/2009 | Reed et al. | 455/424 |
| 2013/0097465 A1 * | 4/2013 | Eslambolchi et al. | 714/57 |

* cited by examiner

*Primary Examiner* — Syling Yen

(57) ABSTRACT

A first server is configured to receive one or more summarized data groups from a second server. Each summarized data group may include: information regarding a quantity of a group of records, where the group of records includes records associated with a record type and a time interval; information regarding a quantity of records associated with an indicator within the group of records; and information regarding a failure rate associated with the group of records based on the quantity of records associated with the group of records and the quantity of records associated with the indicator within the group of records. The first server is further configured to determine a threshold based on the summarized data groups and based on the failure rates associated with the summarized data groups and send an indication to the client device based on determining that the failure rate does not satisfy the threshold.

24 Claims, 10 Drawing Sheets

| Record ID | Record type | Success/Fail | Timestamp | Market | User device information | |
|---|---|---|---|---|---|---|
| | | | | | IMEI | ICCID |
| 123 | Call initiation | Success | Mon 13:01:04 | Baltimore | 123456789012344 | 1234567890l1 |
| 345 | Completed call | Success | Mon 13:01:08 | Baltimore | 123456789012345 | 1234567890l2 |
| 678 | Data request | Fail | Mon 13:01:18 | Boston | 123456789012346 | 1234567890l3 |

Fig. 6

| Header | | |
|---|---|---|
| Time period: Mon 13:01:00-13:01:59 | | |
| Record type: Call initiation | | |
| Market: Baltimore | | |

| Historical failure data | | | |
|---|---|---|---|
| Week | Failures | Total Records | Rate |
| 1/1/01-1/7/01 | 5 | 500 | 1.00% |
| 1/8/01-1/14/01 | 7 | 785 | 0.89% |
| 1/15/01-1/21/01 | 6 | 698 | 0.86% |
| 1/22/01-1/28/01 | 2 | 354 | 0.56% |
| 1/29/01-2/4/01 | 6 | 458 | 1.31% |
| 2/5/01-2/13/01 | 11 | 985 | 1.12% |
| 2/12/01-2/18/01 | 8 | 543 | 1.47% |
| 2/19/01-2/25/01 | 9 | 268 | 3.36% |
| 2/26/01-3/4/01 | 4 | 485 | 0.82% |
| 3/5/01-3/11/01 | 2 | 298 | 0.67% |

| Threshold Data | | | |
|---|---|---|---|
| Average | 6.00 | 537.40 | 1.12% |
| Standard Deviation | 2.91 | | 0.54% |
| Threshold multiplier | 2 | | |
| Threshold | 2.20% | | |

Fig. 7

| Record type | Market | Real-time failure data | | | Historical failure data/thresholds | | | |
|---|---|---|---|---|---|---|---|---|
| | | Mon 13:01:00-13:01:59 | Mon 13:02:00-13:02:59 | Mon 13:03:00-13:03:59 | Mon 12:03:59-13:03:59 | Mon 13:01:00-13:01:59 | Mon 13:02:00-13:02:59 | Mon 13:03:00-13:03:59 | Mon 12:03:59-13:03:59 |
| Call initiation | Baltimore | 1.00% | 0.82% | 4.50% | 1.26% | 1.12%, 2.20% | 1.52%, 2.33% | 1.22%, 2.12% | 1.129%, 2.15% |
| Completed Call | Baltimore | 0.18% | 0.42% | 0.78% | 0.24% | .45%, 1.1% | .41%, 1.1% | .49%, 1.2% | .35%, .95% |
| Data request | Boston | 0.46% | 0.24% | 0.35% | 0.25% | .29%, .68% | .32%, .71% | .22%, .61% | .35%, .75% |

REAL-TIME DATA THRESHOLD GENERATION AND MONITORING

BACKGROUND

Users sometimes use client devices to receive and analyze data, such as failure data for specific events. Proper analysis of failure data may allow effective diagnoses and repair of a system associated with the failure data. High-volume data may cause lengthy analysis procedures and inaccurate analysis results, thereby compromising the quality and efficiency of the system.

BRIEF DESCRIPTION OF THE DRAWINGS

FIG. 6 illustrates an example data structure that may be stored by one or more servers, such as an external data server;

FIG. 7 illustrates an example data structure that may be stored by one or more servers, such as an aggregation server;

FIG. 8 illustrates an example data structure that may be stored by one or more servers, such as an aggregation server;

DETAILED DESCRIPTION OF THE PREFERRED EMBODIMENTS

The following detailed description refers to the accompanying drawings. The same reference numbers in different drawings may identify the same or similar elements.

A system and/or method, as described herein, may identify failure rates associated with a type of event (e.g., a network transaction type for a cellular network). The system and/or method may further generate failure rate thresholds (referred to as "thresholds") for one or more network transaction types (e.g., telephone call initiations, telephone call completions, data request transactions, etc). In some implementations, the system and/or method may generate different thresholds for different time periods and/or different network transaction types (e.g., the threshold for a telephone call initiation network transaction type at 12:00:00 may differ from the threshold for a telephone call completion network transaction type at 13:00:00). Additionally, the system and/or method may update the thresholds in real-time and/or at regular time intervals (e.g., every minute, every hour, etc).

The system and/or method may also identify instances in which a failure rate for a particular network transaction type is outside of the threshold, and cause a client device to present a summary of data associated with the failure rates per network transaction type during a particular time period.

Figure 1:
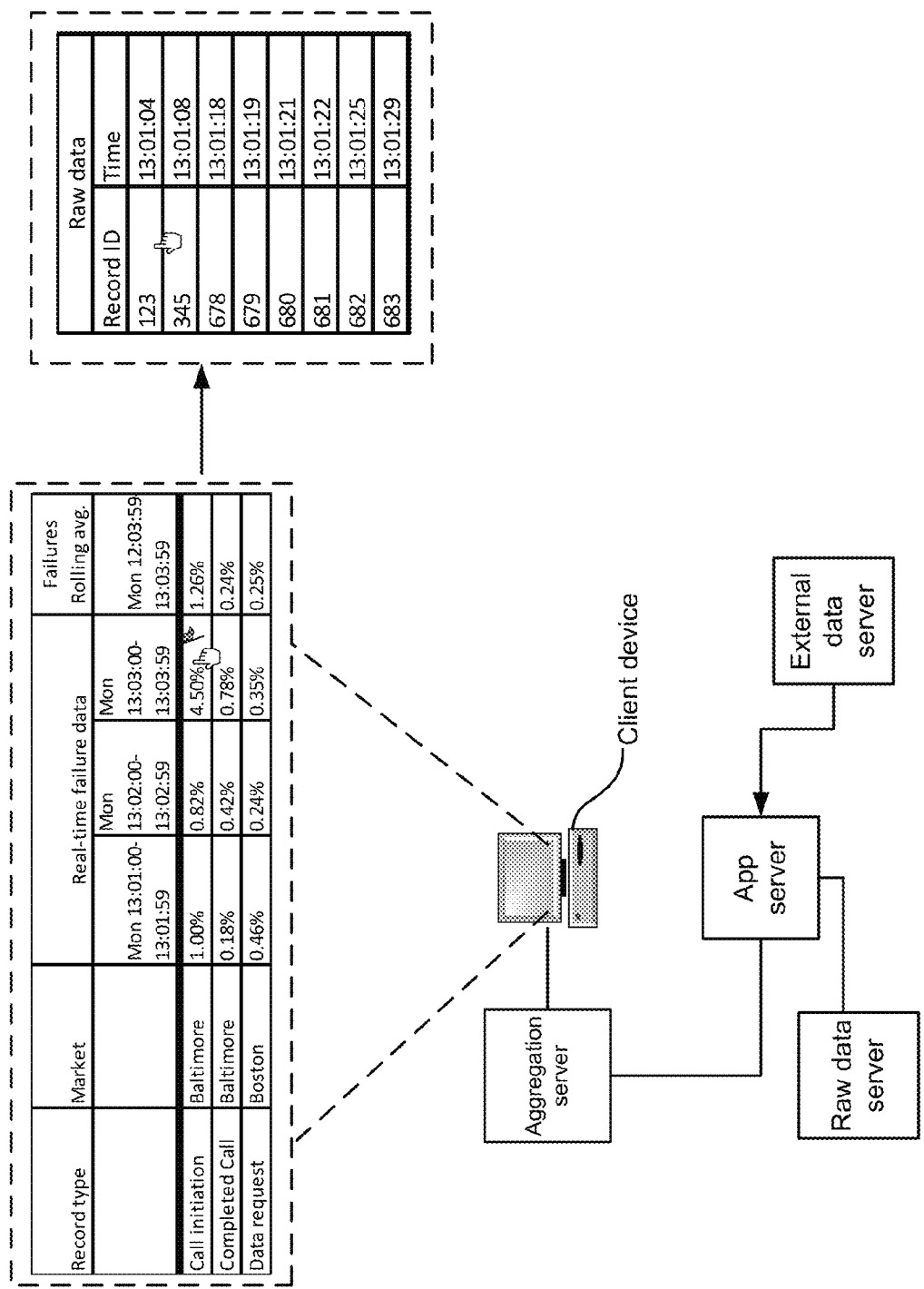
FIG. 1 illustrates an example overview of an implementation described herein.

FIG. 1 illustrates an example overview of an implementation described herein. As shown in FIG. 1, an application server (referred to as "app server"), may receive raw data from an external data server. For example, the external data server may be associated with user devices subscribed to mobile services (e.g., mobile telephone services) and may store raw data associated with network transactions associated with corresponding user devices. In some implementations, the external data server may store raw data in the form of records, where each record includes a record type (corresponding with the network transaction type), a timestamp, a market (e.g., a cellular node or group of cellular nodes responsible for processing the network transaction associated with the record), a success or failure indicator, and/or some other information. Additionally, or alternatively, the external data server may store some other data for some other purpose.

As further shown in FIG. 1, the app server may form summarized failure data (referred to as "summarized data") by determining a failure rate of each record type associated with a particular market during a particular time period (e.g., by dividing the number of records with failure indications for a record type in a particular market and time period by the total number of records). In some implementations, and as shown in FIG. 1, the summarized data may be stored by a data structure in a spreadsheet format with cells, where each cell stores a failure rate for a record type within a particular market and a particular time period (e.g., a failure rate of 1.00% for the call initiation record type in the Baltimore market during the Monday 13:01:00-13:01:59 time period). In some implementations, the summarized data may correspond to failure data, such as failure rates within time periods corresponding to the current time (e.g., the failure rates within the Monday 13:03:00-13:03:59 time period may be determined on Monday at 13:04:00).

Additionally, or alternatively, the app server may transfer copies of raw data records to a raw data server, to allow a client device to access raw data, associated with the summarized data, without communicating with the external data server.

As further shown in FIG. 1, an aggregation server may receive the summarized data from one or more app servers, and may aggregate the summarized data (e.g., combine data in a situation in which the aggregation server receives data from multiple app servers). Further, the aggregation server may send the summarized data to a client device. The client device may present the summarized data (e.g. in a spreadsheet format, a database format, a table format, or some other format within a user interface (UI) of the client device). As described above, the aggregation server may update the summarized data at regular intervals. The client device may display the updated summarized data at each interval.

Additionally, or alternatively, the aggregation server may store historical summarized data for each record by record type, market, and time period. For example, the aggregation server may store N (where N≥1) weeks (or some other time period) of failure rate data for call initiation records in the Baltimore market for Mondays between the times 13:01:00-13:01:59. Additionally, the aggregation server may generate a threshold for each record type by market and time period based on statistical parameters of the historical data (e.g., based on standard deviations, averages, and/or some other statistical parameter associated with failure rates for a record type). The aggregation server may identify instances in which the failure rate exceeds the threshold (e.g., by displaying a flag on the cell associated with the exceeded threshold, or by changing the color of the cell associated with the exceeded threshold).

For example, as shown in FIG. 1, assume that the aggregation server calculates a threshold of 2.5% for call initiations in the Baltimore market during the Monday, 13:03:00-13:03:59 time period. The aggregation server may identify that the failure rate for call initiations in the Baltimore market during the Monday, 13:03:00-13:03:59 time period (e.g., 4.5%) has exceeded the threshold failure rate (e.g., 2.5%), and may indicate the exceeded threshold with a flag on the cell displaying the exceeded threshold. Additionally, or alternatively, a user, associated with the client device, may instruct the aggregation server to provide the client device with raw data associated with a cell displaying a failure rate (e.g., a cell displaying an exceeded threshold or any other cell). Based on the instruction, the aggregation server may cause the raw data server to send the raw data (e.g., to investigate the raw data causing the failure rate).

While the systems and/or methods are described in the context of analyzing data for cellular networks, the systems and/or methods are not so limited. For example, the systems and/or methods may be used to analyze data for any application, including or excluding data associated with cellular networks, and may be used to generate thresholds for any type of data using the techniques described.

Figure 2:
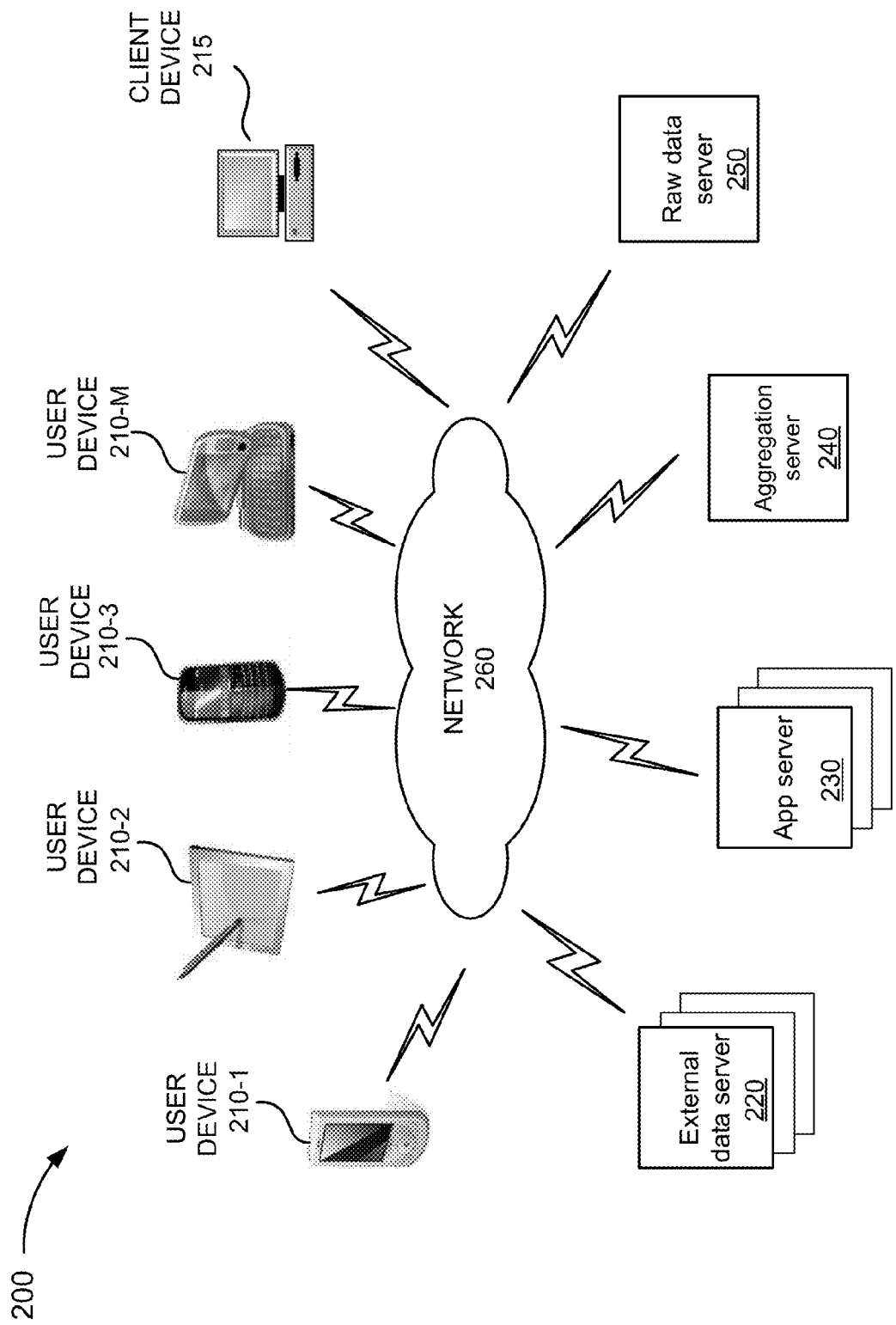
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user devices 210-1, 210-2, . . . , 210-M (where M≥1) (collectively referred to as "user devices 210," and individually as "user device 210"), client device 215, external data server 220, app server 230, aggregation server 240, raw data server 250, and network 260. While FIG. 2 shows a particular number and arrangement of devices, in practice, environment 200 may include additional devices, fewer devices, different devices, or differently arranged devices than are shown in FIG. 2. For example, each of servers 220-250 may be implemented as multiple, possibly distributed, devices. Alternatively, two or more of servers 220-250 may be implemented within a single device. Further, a function described as being performed by one server may be performed by another server.

User device 210 may include any portable or non-portable device capable of communicating via a network, such as network 260. For example, user device 210 may correspond to a mobile communication device (e.g., a mobile phone or a personal digital assistant (PDA)), a portable computer device (e.g., a laptop or a tablet computer), or another type of portable device.

Client device 215 may include any portable or non-portable device capable of communicating via a network, such as network 260. Additionally, or alternatively, client device 215 may include a device capable of receiving data from a server, such as aggregation server 240, and may include a UI to display data received from a server, such as aggregation server 240. For example, client device 215 may correspond to a desktop computer, a server, or the like.

External data server 220 may include a computing device, such as a server device or a collection of server devices. In some implementations, external data server 220 may be associated with user devices 210 subscribed to mobile services (e.g., mobile telephone services) and may store raw data associated with network transactions from corresponding user devices 210. External data server 220 may store raw data in the form of records. As described above, each record may be associated with a network transaction and may include information, such as a record ID, a timestamp, user device 210 information (e.g., an international mobile equipment identity (IMEI) number, an integrated circuit card identification (ICCID) number, etc), a record type, information regarding a cellular node, or information identifying a group of cellular nodes associated with the record (e.g., a market, or some other group), a success or failure indication, and/or some other information. Additionally, or alternatively, the external data server may store some other data for some other purpose. In some implementations, external data server 220 may include a collection of server devices associated with different parties.

App server 230 may include a computing device, such as a server device or a collection of server devices. In some implementations, app server 230 may receive information from external data server 220, such as raw data associated with network transaction records. In some implementations, app server 230 may form summarized data by determining failure rates for one or more record types, where each record type is associated with a particular market and a particular time period. For example, app server 230 may determine a failure rate of a record type associated with a particular market and particular time period based on the total number of records associated with the record type, and the number of records with failure indicators within the total number of records. Additionally, app server 230 may send the summarized data to aggregation server 240. Additionally, or alternatively, app server 230 may send copies of the raw data, associated with the summarized data, to raw data server 250 to allow client device 215 to access the raw data without communicating with external data server 220.

Aggregation server 240 may include a computing device, such as a server device or a collection of server devices. For example, aggregation server 240 may include a server device that receives summarized data from app server 220. In some implementations, aggregation server 240 may receive summarized data from multiple app servers 220, and aggregate and/or combine the summarized data. For example, assume that aggregation server 240 receives summarized data associated with the call initiation record type for the Baltimore market and the Monday, 13:01:00-13:01:59 time period from multiple app servers (e.g., aggregation server 240 receives records including 5 records with failure indicators out of 500 total records from one app server 230 and 10 records with failure indicators out of 500 total records from some other app server 230). Aggregation server 240 may store the combined data (e.g., 15 records with failure indications out of 1000 total records) associated with the market, record type, and time period. Additionally, aggregation server 240 may store historical data, and generate failure thresholds for failure rates by record type, market, and time period. Some examples of generating failure thresholds are described above with respect to FIG. 1.

Raw data server 250 may include a computing device, such as a server device or a collection of server devices. In some implementations, raw data server 250 may receive and/or store raw data from app server 230. For example, as described above, app sever 230 may form summarized data based on raw data received from external data server 220 and send copies of raw data to raw data server 250. Raw data server 250 may receive copies of raw data from app server 230 to allow client device 215 to access raw data without communicating with external data server 220. In some implementations raw data server 250 may combine raw data originated from multiple external data servers 220 thereby allowing client device 215 to access raw data from a single raw data server 250.

In one implementation, the interactions between servers 220-250 may be performed using the hypertext transfer protocol (HTTP) or the secure HTTP (HTTPS). In one implementation, the interactions between servers 220-250 may be performed using another type of protocol.

Network 260 may include any type of network or a combination of networks. For example, network 260 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic (e.g., FiOS), or a combination of networks. Network 260 may further, or alternatively, include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. Each of user device 210, client device 215, external data server 220, app server 230, aggregation server 240, raw data server 250 may connect to network 260 via a wireless connection, a wired connection, or a combination thereof.

Figure 3:
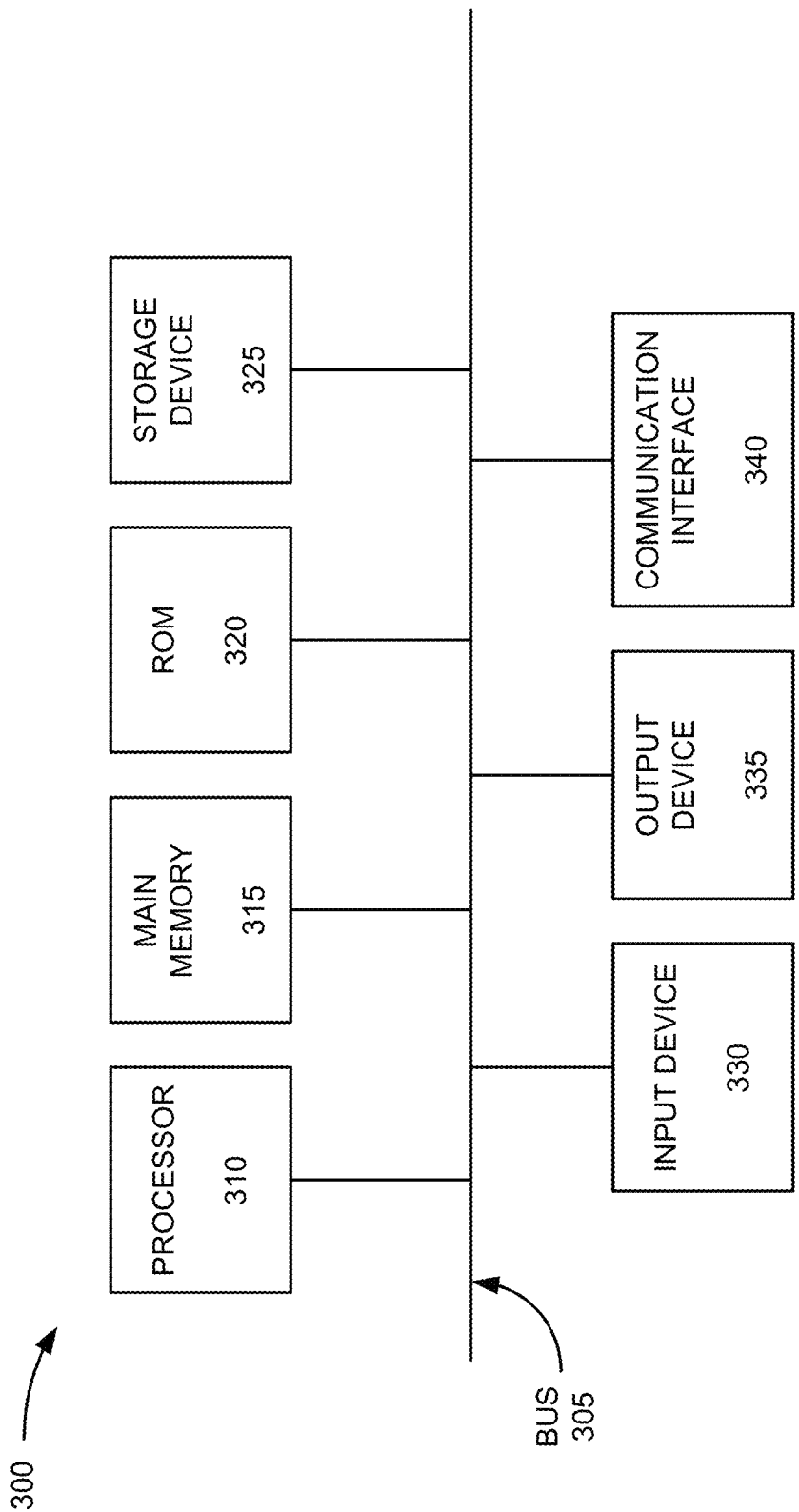
FIG. 3 illustrates example components of a device that may be used within the environment of FIG. 2.

FIG. 3 illustrates example components of a device 300 that may be used within environment 200 of FIG. 2. Device 300 may correspond to user device 210, client device 215, and/or servers 220-250. Each of user device 210, client device 215, and/or servers 220-250 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
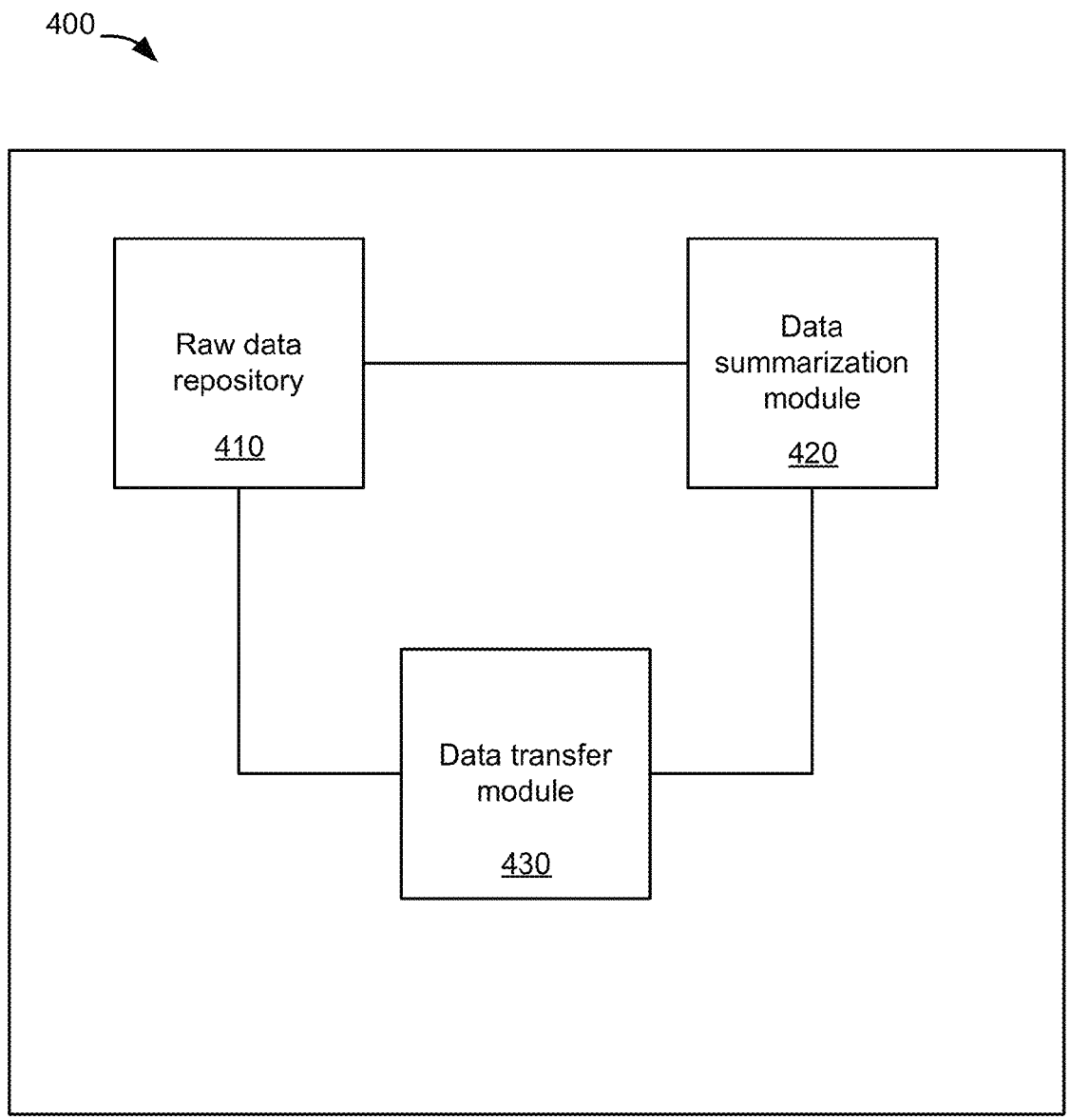
FIG. 4 illustrates example functional components of an example system.

FIG. 4 illustrates example functional components of an example system. In some implementations, system 400 may include functional components implemented by a server, such as app server 230. In some other implementation, system 400 may include functional components implemented by one or more devices, which include or exclude app server 230. For example, servers 240 and/or 250 may include some or all of the functional components of system 400.

As shown in FIG. 4, system 400 may include raw data repository 410, data summarization module 420 and/or data transfer module 430. In some implementations, system 400 may include fewer, additional, or different modules. Any, or all, of modules 410-430 may be implemented by one or more memory devices (such as main memory 315) and/or one or more processors (such as processor 310). Furthermore, multiple modules 410-430 may be associated with the same memory device and/or processor (e.g., one memory device, or one set of memory devices, may store information associated with two or more of modules 410-430).

Raw data repository 410 may receive and/or store raw data from external data server 220. For example, as described above, external data server 220 may store raw data associated with network transactions initiated by user devices 210. In some implementations, raw data repository 410 may receive raw data in the form of records, where each record is associated with a network transaction. Additionally, each record may include information, such as a record ID, a timestamp, information for user device 210 associated with the network transaction (e.g., IMEI number, ICCID number, etc), a transaction or record type (e.g., telephone calls (referred to as "calls") initiated, calls completed, data requests (e.g., a number of data packets sent in response to a request for data packets from a user device to perform operations, such as sending and/or receiving e-mail, browsing the internet, etc)), information identifying a cellular node, or information identifying a group of cellular nodes responsible for processing the network transaction associated with the record (e.g., a market, or some other group), a success or failure indication, and/or some other information.

Data summarization model 420 may receive raw data from raw data repository 410 and form summarized data based on the raw data. For example, module 420 may form summarized data by determining failure rates for one or more record types, where each record type may be associated with a particular market and a particular time period. For example, module 420 may determine a failure rate of a record type associated with a particular market and particular time period based on the total number of records associated with the record type, and the number of records with failure indicators within the total number of records. For example, as described above with respect to FIG. 1, one example of summarized data may include a failure rate (e.g., 1.00%) for a record type (e.g., the "call initiation" type) in a particular market (e.g., the "Baltimore" market) during a particular time period (e.g., the Monday 13:01:00-13:01:59 time period). Module 420 may generate multiple instances of summarized data, where an instance of summarized data stores information regarding a failure rate for a particular record type associated with a particular market and particular time period.

Data transfer module 430 may transfer raw data stored by raw data repository 410 to raw data server 250 to allow client device 215 to receive raw data, associated with the summarized data, from raw data server 250 without communicating with external data server 220. Additionally, or alternatively, module 430 may transfer summarized data to aggregation server 240 to allow aggregation server 240 to aggregate summarized data received from app servers 230, to store historical summarized data, and/or to generate failure thresholds based on the historical summarized data.

Figure 5:
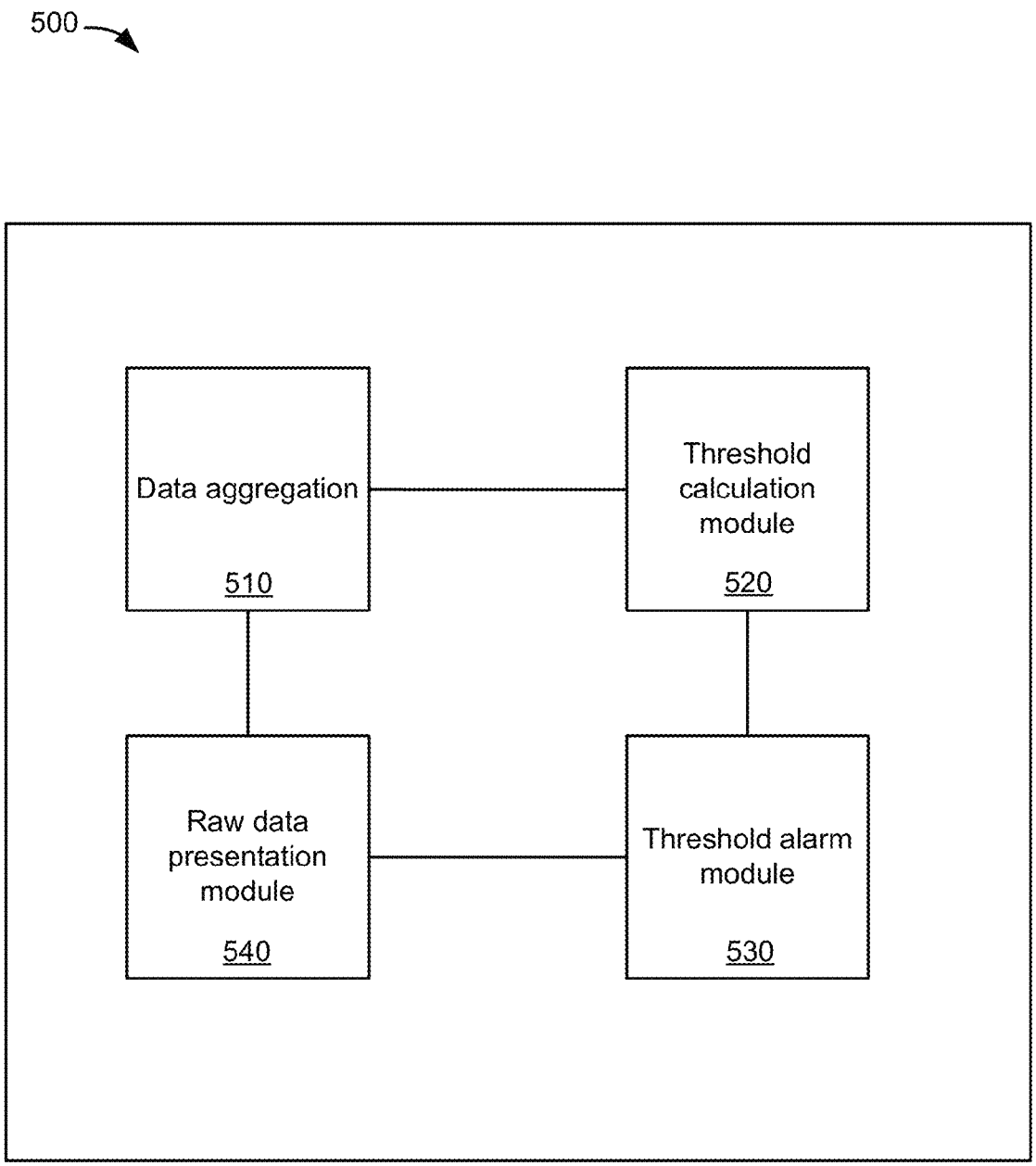
FIG. 5 illustrates example functional components of an example system.

FIG. 5 illustrates example functional components of an example system 500. In some implementations, system 500 may include functional components implemented by a server, such as aggregation server 240. In some other implementation, system 500 may include functional components implemented by one or more devices, which includes or excludes aggregation server 240. For example, app server 230 and/or raw data server 250 may include some or all of the functional components of system 500.

As shown in FIG. 5, system 500 may include data aggregation module 510, threshold calculation module 520, threshold alarm module 530, and/or raw data presentation module 540. In some implementations, system 500 may include fewer, additional, or different modules. Any, or all, of modules 510-540 may be implemented by one or more memory devices (such as main memory 315) and/or one or more processors (such as processor 310). Furthermore, multiple modules 510-540 may be associated with the same memory device and/or processor (e.g., one memory device, or one set of memory devices, may store information associated with two or more of modules 510-540).

Data aggregation module 510 may combine summarized data received from one or more app servers 230. An example of data aggregation that may be performed by module 510 is described above with respect to aggregation server 240. Additionally, or alternatively, module 510 may store historical failure rate data corresponding to summarized data over a time interval. For example, module 510 may store N (where N≥1) weeks (or some other time interval) of failure rate data for call initiation records in the Baltimore market for the Monday, 13:01:00-13:01:59 time period. Additionally, or alternatively, module 510 may aggregate the summarized data in real time and present the aggregated and summarized data in a UI of client device 215 (e.g., in a spreadsheet format with cells as described above with respect to FIG. 1, a table, a database, a list, and/or some other format).

Threshold calculation module 520 may calculate a threshold for a record type in a market during a time period. For example, module 520 may generate a failure rate threshold for call initiations in the Baltimore market for the Monday, 13:00:00-13:00:59 time period based on statistical parameters (e.g., standard deviations, averages, and/or some other statistical parameter) of historical failure data for the same record type, market, and time period.

In one example, module 520 may receive historical failure rates from module 510 for the call initiation record type in the Baltimore market for the Monday, 13:01:00-13:01:59 time period for the past N (where N≥1) weeks (or some other time interval). Based on the N weeks of data (e.g., 10 weeks of data), module 520 may determine an average failure rate (e.g., 1.12%) and a standard deviation (e.g., 0.54%) of the failure rate for call initiations in the Baltimore market for the Monday, 13:01:00-13:01:59 time period. Further, module 520 may determine a threshold based on the historical failure data and a threshold multiplier (e.g., a threshold multiplier of 2 standard deviations away from the average corresponds to a threshold of 2.2%, where threshold=average failure rate+threshold multiplier*standard deviation). In some implementations, the threshold multiplier may be user-generated, automatically generated, or generated using some other technique. Additionally, or alternatively, module 520 may determine the threshold using some other technique (e.g., based on an average failure rate and/or some other statistical parameter including or excluding a standard deviation).

Threshold alarm module 530 may identify real-time failure rates exceeding the threshold calculated by module 520. For example, assume that module 520 calculates a threshold of 2.50% for call initiations in the Baltimore market for the Monday, 13:03:00-13:03:59 time period. Further assume that module 510 identifies that the real-time failure rate for call initiations in the Baltimore market for Monday between the times 13:03:00-13:03:59 is 4.50%. In this case, module 530 may determine that the real-time failure rate is greater than the threshold and may generate an alarm or some other indication (e.g., module 530 may generate a flag, change the color of the cell in which the real-time data with the exceeded threshold is stored, and/or generate some other indication).

Raw data presentation module 540 may cause raw data server 250 to provide raw data to client device 215 in response to receiving a request from client device 215 to provide raw data associated with summarized data (e.g., summarized data stored by a cell in a spreadsheet, a table, a database, and/or stored using some other technique). For example, assume that a cell stores information for a failure rate (e.g., a 4.5% failure rate) for a record type (e.g., the call initiation record type), in a market (e.g., the "Baltimore" market), during a time period (e.g., the time period corresponding to the Monday 13:03:00-13:03:59 time period). Raw data presentation module 540 may receive a request from client device 215 to obtain the raw data associated with the summarized data stored by the corresponding cell. In some implementations, a user, associated with client device 215, may instruct raw data module 540 to provide raw data in order to allow the user to investigate the failure rate associated with a record type, market, and time period.

FIG. 6 illustrates an example data structure 600 that may be stored by one or more servers, such as external data server 220. In one implementation, data structure 600 may be stored in a memory of external data server 220. In another implementation, data structure 600 may be stored in a memory separate from, but accessible by, external data server 220. External data server 220 may store multiple data structures 600, where each data structure 600 is associated with raw data for network transactions as described above, and/or with some other information. A particular instance of data structure 600 may contain different information and/or fields than another instance of data structure 600. Additionally, or alternatively, data structure 600 may be stored by app server 230 based on receiving raw data from external data server 220. Additionally, or alternatively, data structure 600 may be stored by raw data server 250 based on receiving raw data from external data server 220 and/or app server 230. In some implementations, data structure 600 may store raw data in the form of one or more entries, where each entry is a record corresponding to a network transaction associated with user device 210.

As shown in FIG. 6, data structure 600 may include record ID field 610, record type field 620, success/fail field 630, timestamp field 640, market field 650 and/or user device information field 660. In some implementations, data structure 600 may include additional fields, fewer fields, different fields, or differently arranged fields than are shown in FIG. 6.

Record ID field 610 may store a unique character string (e.g., "123") to identify a record associated with a network transaction associated with user device 210. For example, external data server 220 may automatically generate a record ID when a network transaction completes, such as when a call is established, when a call is completed when requested, when data is provided when requested, and/or when some other network transaction completes. While record ID field 610 shown in data structure 600 stores three-digit character strings, in practice, record ID field 610 may store any format and length of character strings.

Record type field 620 may store information to identify a type of record associated with a corresponding record ID. For example, a record type may include a call initiation type (e.g., when user device 210 places a call), a completed call type (e.g., when user device 210 completes a call without the call being interrupted by a network outage), a data request type (e.g., a request for data packets from user device 210 to perform operations, such as sending and/or receiving e-mail, browsing the internet, etc.), and/or some other record type. In some implementations, information in record type field 620 may be determined from a corresponding record received by raw data server 220. Alternatively, information in record type field 620 may be determined using some other technique. In an example shown in FIG. 6, record type field 620 may store the "call initiation" record type associated with the record ID "123."

Success/failure identification field 630 may store an indicator to identify whether the network transaction associated with the record ID was successful or unsuccessful (e.g., a success indication corresponding to a successful network transaction or a failure indication corresponding to an unsuccessful network transaction). For example, a call initiation record type may be determined to be successful if a call was successfully placed in response to an instruction by user device 210 to place the call. In some other example, a completed call type may be determined to be successful if a call was terminated in response to receiving an instruction by user device 210 to terminate the call. A completed call type may be determined to be unsuccessful (e.g., to have failed) when a call is terminated without receiving an instruction from to terminate the call (e.g., terminated due to a network outage). In another example, a data request type may be determined to be successful if user device 210 receives data packets in response to a request to receive data packets to perform operations such as sending and/or receiving e-mail, browsing the internet, etc.

In some implementations, information in success/failure identification field 630 may be included in a corresponding record received from raw data server 220. Alternatively, information in success/failure identification field 630 may be determined using some other technique. In an example shown in FIG. 6, success/fail identification field 630 may store the "success" indication associated with the record ID "123."

Timestamp field 640 may include a date, day of the week, and/or time associated with a corresponding record. For example, as shown in FIG. 6, timestamp field 640 associated with the record ID "123" may store the day of the week (e.g., Monday) and the time (e.g., 13:01:04), corresponding to a time in which record ID "123" was stored by data structure 600 (e.g., the time in which the network transaction associated with record ID "123" occurred in real time). While the examples shown in FIG. 6 show timestamp field 640 storing only a day of the week and a time, in practice, timestamp field 640 may store other information, including a date.

Market field 650 may store information to identify a single cellular node, or information identifying a group of cellular nodes, associated with a corresponding record. In one implementation, market field 650 may store information descriptive of a geographic location associated with a cellular node or with a group of cellular nodes responsible for processing network transactions associated with user device 210. For example, market field 650 may describe the market with which a corresponding record is associated (e.g., a market responsible for processing the network transaction associated with the record). In an example shown in FIG. 6, market field 650 may store the "Baltimore" market associated with the record ID "123" indicating that the network transaction associated with record ID "123" occurred in the Baltimore market (e.g., the cellular nodes comprising the Baltimore market were responsible for processing the network transaction associated with record ID "123").

User device information field 660 may include information identifying a user device 210 associated with a corresponding record. For example, user device information field 660 may identify a user device 210 which initiated a network transaction associated with a record. In an example shown in FIG. 6, user device information field 660 indicates that the user device 210 with the IMEI "123456789012344" and ICCID "123456789011" corresponds to record ID "123." In some implementations, information in user device information field 660 may be used to identify specific user devices 210 with high failure rates.

FIG. 7 illustrates an example data structure 700 that may be stored by one or more servers, such as aggregation server 240. In one implementation, data structure 700 may be stored in a memory of aggregation server 240. In another implementation, data structure 700 may be stored in a memory separate from, but accessible by, aggregation server 240. Aggregation server 240 may store multiple data structures 700, where each data structure 700 is associated with historical failure data and with threshold data for a record type within a particular market and particular time period.

For example, as shown in FIG. 7, data structure 700 may store historical failure data and threshold data for the call initiation record type in the Baltimore market and the Monday, 13:01:00-13:01:59 time period. In some other example, data structure 700 may store historical failure data and threshold data for some other record type, market, and/or time period. A particular instance of data structure 700 may contain different information and/or fields than another instance of data structure 700. Additionally, or alternatively, data structure 700 may be stored by app server 230.

As shown in FIG. 7, data structure 700 may include header field 710, historical failure data field 720, and/or threshold data field 730. In some implementations, data structure 700 may include additional fields, fewer fields, different fields, or differently arranged fields than are shown in FIG. 7.

Header field 710 may include information to identify a record type, a market, and/or a time period associated with data structure 700. As described above, data structure 700, described with respect to FIG. 7, may store historical failure data and threshold data for the call initiation record type in the "Baltimore" market and the Monday, 13:01:00-13:01:59 time period. In some other example, data structure 700 may store historical failure data and threshold data for some other record type, market, and/or time period.

Historical failure data field 720 may receive summarized data from app server 230 and may store summarized data for the call type, market, and time period corresponding to the information in header field 710 over an interval of time (e.g., a 10-week interval of time or some other interval of time) by an increment of time (e.g., 1-week increments). For example, historical failure data field 720 may store information identifying the number of total records with the same record type, market, and time period as in header field 710 for a particular interval of time (e.g., from the dates Jan. 1, 2001-Jan. 7, 2001). Additionally, historical data field 720 may store information identifying the number records with failure indications with the same record type, market, and time period as in header field 710 for the particular interval of time, to determine a failure rate.

In some implementations, historical data field 520 may store information identifying the number of records in real time (e.g., as records are received from external data server 220 and/or app server 230) and store the number of records in weekly increments (or some other increment), as determined by the timestamp associated with the records.

For example, referring back to data structure 600, the record associated with record ID "123" is of the "call initiation" record type, the "Baltimore" market, and the Monday 13:01:00-13:01:59 time period. Since the record type, market, and timestamp of record ID "123" corresponds to the record type, market, and time period of the example data structure 700 shown in FIG. 7, historical failure data field 720 may count record ID 123 as part of the total number of records. Further assume that the timestamp of record ID "123" indicates a date of Mar. 5, 2001. In this case, historical failure data field 720 may store the count for record ID "123" as part of the totals for the week of Mar. 5, 2001-Mar. 11, 2001. Additionally, information in historical failure data field 720 may update in real-time as records are received, or may update at a time after records are received (e.g., one minute, one hour, one day, or some other time after records are received).

Threshold data field 730 may store information based on information in historical failure data field 720. For example, threshold data field 730 may store information identifying the average number of failures (e.g., 6.00), the average total records (537.40), and the average failure rate (1.12%) based on information in historical failure data field 720. Additionally, or alternatively, threshold data field 730 may store a standard deviation of the number of totals and/or the standard deviation of the failure rate. Additionally, threshold data field 730 may store a threshold multiplier (e.g. 2) and a threshold (2.2%, where threshold=average failure rate+threshold multiplier*standard deviation), as described above with respect to module 520.

FIG. 8 illustrates an example data structure 800 that may be stored by one or more servers, such as aggregation server 240. In one implementation, data structure 800 may be stored in a memory of aggregation server 240. In another implementation, data structure 800 may be stored in a memory separate from, but accessible by, aggregation server 240. Data structure 800 may include one or more entries, where each entry describes summarized historical and real-time failure rate data by record type and/or market. In some implementations, data structure 800 may be displayed in a UI of client device 215.

For example, as shown in FIG. 8, data structure 800 may store real-time failure data and historical failure data associated with the call initiation record type in the Baltimore market and the Monday, 13:01:00-13:01:59 time period. Additionally, or alternatively, data structure 800 may store real-time failure data and historical failure data for some other record type, market, and/or time period. A particular instance of data structure 800 may contain different information and/or fields than another instance of data structure 800. Additionally, or alternatively, data structure 800 may be stored by app server 230.

As shown in FIG. 8, data structure 800 may include record type field 810, market field 820, real-time failure data field 830, and/or historical failure data/thresholds field 840.

As described above with respect to data structure 600, record type field 810 may store a description of a type of record or network transaction (e.g., call initiation, completed call, data request, and/or some other record type).

As described above with respect to data structure 600, market field 820 may store information to identify a cellular node or a group of cellular nodes associated with a corresponding record (e.g., the "Baltimore" market describing a group of cellular nodes comprising the Baltimore market).

Real-time failure data field 830 may include summarized data received from one or more app servers 230. For example, as described above, real-time data field 830 may store information identifying a failure rate percentage based on a number of total records for a record type, a market, and a time period and a number of records with failure indications for the same record type, market, and time period. Real-time data field 830 may store information identifying a failure rate percentage in real-time (e.g., as records are received from external data server 220 and/or app server 230).

In an example shown in FIG. 8, assume that the current time corresponding to data structure 800 is Monday at 13:04:00. Real-time failure data field 830 may store a failure rate of 4.50% for the call initiation record type in the Baltimore market and the Monday, 13:03:00-13:03:59 time period. Additionally, or alternatively, real-time failure data field 830 may store failure rates for the previous N time periods (e.g., as shown in FIG. 8, real-time failure data field 830 stores failure rates for the previous 2 time periods). Additionally, or alternatively, real-time failure data field 830 may store a rolling 1-hour average time period (e.g., Monday 12:03:59-13:03:59). Continuing with the above example, real-time failure data field 830 may store failure data for the Monday 13:04:00-13:04:59 time period when the current time reaches Monday 13:05:00. As a result, real-time failure data field 830 may store up-to-the-minute failure data for a record type by market and time period.

Additionally, or alternatively, as described above, real-time failure data field 830 may store an indication of a failure rate exceeding a threshold (e.g., by generating a flag, or by changing the color of the cell in which the exceeded failure rate is stored).

Historical failure data/threshold field 840 may store N-week failure rate averages and threshold values as described above with respect to data structure 700. For example, historical failure data/threshold field 840 may store an N-week (e.g., a 10-week) average failure rate and threshold for a record type, market, and time period corresponding to the record type, market, and time period stored by real-time failure data field 830. Information in historical failure data/threshold field 840 may correspond to data stored by data structure 700. For example, referring back to FIG. 7, assume that data structure 700 stores failure data and threshold data for the call initiation record type in the Baltimore market and the Monday 13:01:00-13:01:59 time period. As shown in FIG. 8, historical failure data/threshold field 840 may store the average failure rate (e.g., 1.12%) and/or the threshold value (e.g., 2.20%) for the call initiation record type in the Baltimore market and the Monday, 13:01:00-13:01:59 time period.

Figure 9:
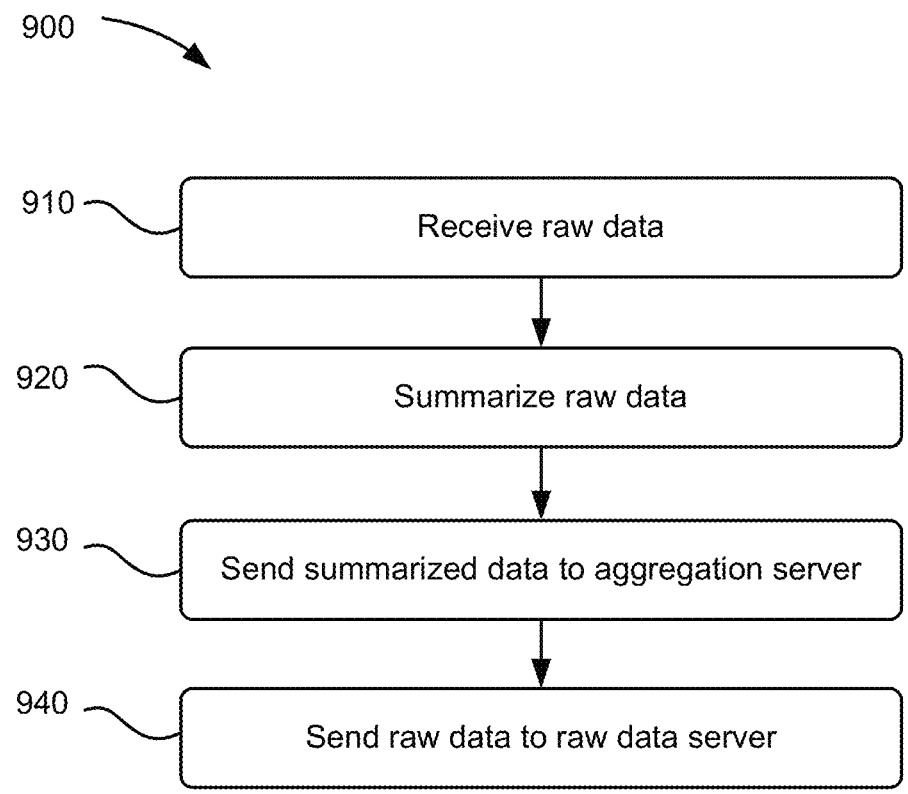
FIG. 9 illustrates a flowchart of an example process for receiving and summarizing raw data associated with network transactions associated with a user device.

FIG. 9 illustrates a flowchart of an example process 900 for receiving and summarizing raw data associated with network transactions initiated by user device 210. In one implementation, process 900 may be performed by one or more components of app server 230, such as processor 310 of app server 230. In another implementation, one or more blocks of process 900 may be performed by one or more components of another device (e.g., servers 240 and/or 250), or a group of devices including or excluding app server 230.

Process 900 may include receiving raw data (block 910). For example, as described above with respect to raw data repository 410, app server 230 may receive raw data from external data server 220. In some implementations, the raw data may include records associated with network transactions initiated by user devices 210 to identify instances of transaction failures by type, time period, and/or market. Additionally, app server 230 may collect raw data from multiple external data servers 220 affiliated with different companies and/or parties.

Process 900 may also include summarizing the raw data (block 920). For example, as described above with respect to data summarization model 420, app server 230 may summarize the raw data by determining the number of total records for a particular record type associated with a particular market and particular time period, the number of failures for the record type, and/or the failure rate for the record type (e.g., the number of failures divided by the total number of records).

Process 900 may further include sending summarized data to aggregation server 240 (block 930). For example, as described above with respect to data transfer module 430, app server 240 may transfer summarized data to aggregation server 240 to allow aggregation server 240 to aggregate summarized data received from multiple app servers 230, store historical summarized data, and/or to generate failure thresholds based on the historical summarized data.

Process 900 may also include sending the raw data to raw data server 250 (block 940). For example, as described above with respect to data transfer module 430, app server 230 may transfer raw data stored by raw data repository 410 to raw data server 250 to allow client device 215 to receive raw data from raw data server 250 without communicating with external data server 220. For example, raw data server 250 may combine raw data originated from multiple external data servers 220 thereby allowing client device 215 to access raw data from a single raw data server 250. In some implementations block 940 may be omitted to allow client device 215 to receive raw data from app server 230 and/or external data server 220.

Figure 10:
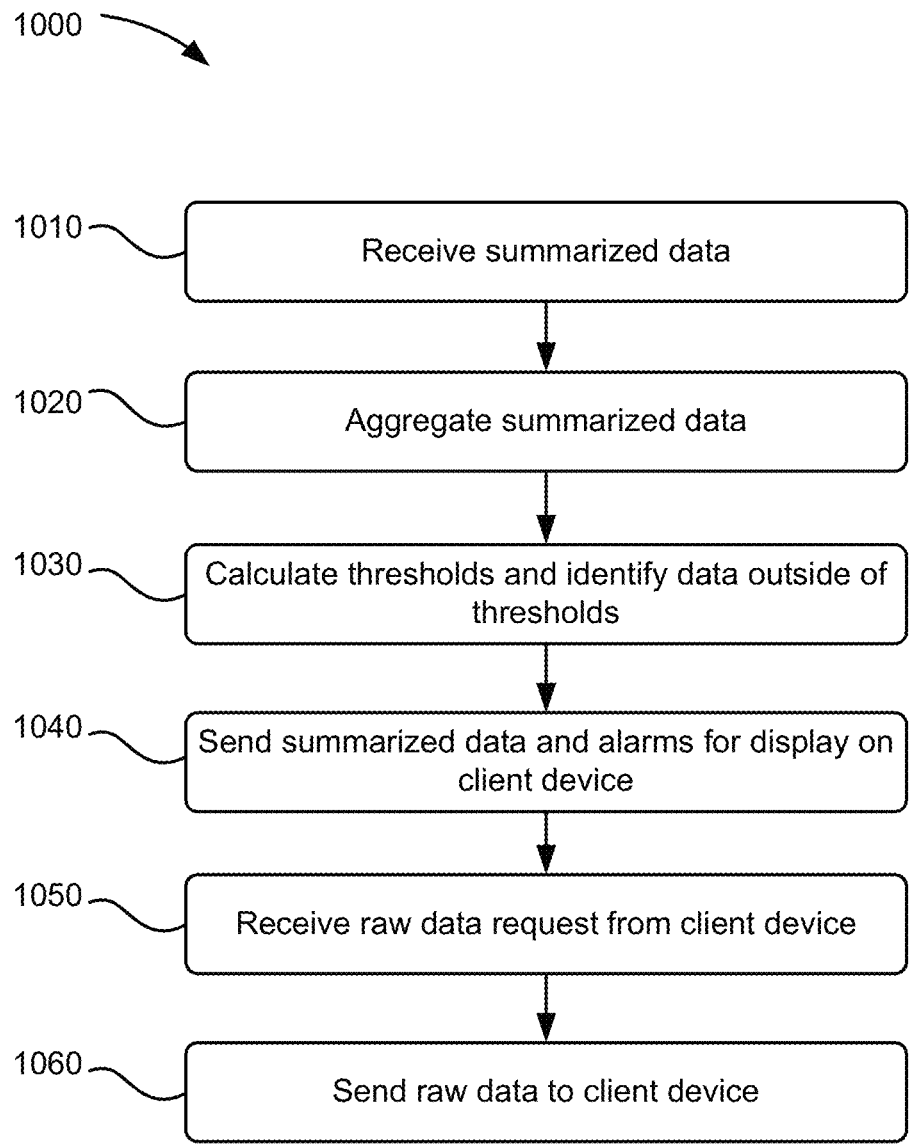
FIG. 10 illustrates a flowchart of an example process for receiving/storing summarized data and calculating thresholds based on stored data.

FIG. 10 illustrates a flowchart of an example process 1000 for receiving/storing summarized data and calculating thresholds based on stored data. In one implementation, process 1000 may be performed by one or more components of aggregation server 240, such as processor 310 of aggregation server 240. In another implementation, one or more blocks of process 900 may be performed by one or more components of another device (e.g., servers 240 and/or 250), or a group of devices including or excluding aggregation server 240.

Process 1000 may include receiving summarized data (block 1010). For example, as described above with respect to data aggregation module 510, aggregation server 240 may receive summarized data from app server 230. In some implementations, aggregation server 240 may receive summarized data from multiple app servers 230.

Process 1000 may further include aggregating the summarized data (block 1020). For example, as described above with respect to data aggregation module 510, aggregation server 240 may combine summarized data received from one or more app servers 230. Additionally, or alternatively, aggregation server 240 may store historical failure data based on receiving summarized data. For example, module 510 may store N weeks of failure data for call initiation record types in the Baltimore market for the Monday, 13:01:00-13:01:59 time period.

Process 1000 may also include calculating thresholds and identifying data outside of thresholds (block 1030). For example, as described above with respect to threshold calculation module 520, aggregation server 240 may generate a failure rate threshold for a record type in a market for a time period based on statistical parameters (e.g., standard deviations, averages, and/or some other statistical parameter) of historical data for the same record type, market, and time period. Further, as described above with respect to threshold alarm module 530, aggregation server 240 may identify failure data exceeding the threshold calculated by module 520 (e.g., aggregation server 240 may generate a flag, change the color of the cell in which the failure data with the exceed threshold is stored, and/or generate some other indication).

Process 1000 may also include sending the summarized data and alarms for display on client device 215 (block 1040). For example, as described above with respect to FIG. 8, aggregation server 240 may send summarized data and alarms to client device 215, where client device 215 may display the summarized data and alarms in a UI of user device 210 (e.g., in a spreadsheet format with cells organizing failure data by record type, market, and/or time period, a database, a table, or some other format). In some implementations, and as described above with respect to FIG. 8, aggregation server 240 may send summarized real-time failure data and/or summarized historical failure data to client device 215.

Process 1000 may further include receiving a raw data request from client device 215 (block 1050). For example, as described above with respect to raw data presentation module 540, aggregation server 240 may receive a request from client device 215 to provide raw data associated with summarized data. In some implementations, aggregation server 240 may receive a request to provide the raw data associated with summarized data based on client device 215 selecting a cell in which summarized data (e.g., a failure rate) is stored. An example of aggregation server 240 receiving a request to provide raw data based on client device 215 selecting a cell is described above with respect to FIG. 1.

Process 1000 may further include sending raw data to client device 215 (block 1060). For example, as described above with respect to raw data presentation module 540, aggregation server 240 may cause raw data server 250 to send raw data to client device 215 in response to aggregation server 240 receiving a request from client device 215 to provide raw data associated with summarized data.

Process 1000 may be used to send summarized data for display on client device 215 (e.g., failure rates by record type, time period and market) in a UI (e.g., in a spreadsheet format, a table, a database, and/or some other format) of client device 215 to allow a user, associated with client device 215, to identify instances in which the failure rate for a particular record type exceeds a threshold. In some implementations, the threshold for one record type in a particular market and a particular time period may be different than the threshold for some other record in another market and another time period. Process 1000 may calculate thresholds for specific situations (e.g., specific combinations of record types, markets, and/or time periods), thereby allowing a user to accurately identify a failure rate that does not satisfy a calculated threshold.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIG. 9-10, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a first server, a plurality of records from a second server,
      a particular record, of the plurality of records, including information identifying a market, a record type, a timestamp, and an indicator, and
      the indicator including one of a first indicator or a second indicator;
   summarizing, by the first server, the plurality of records to obtain a summarized plurality of records,
      summarizing the plurality of records including:
         identifying, by the first server, a group of records,
            the group of records including the particular record and one or more other records, of the plurality of records, associated with the market, the record type, and a particular time interval, and
            the timestamp identifying a time associated with the particular time interval,
         determining, by the first server, a total quantity of records associated with the group of records,
         determining, by the first server, a particular quantity of records, associated with the first indicator, within the group of records,
         determining, by the first server, a failure rate associated with the group of records based on the total quantity of records associated with the group of records and the particular quantity of records associated with the first indicator, and
         storing, by the first server, information regarding the total quantity of records, the particular quantity of records associated with the first indicator, and the failure rate associated with the group of records;
   identifying, by the first server, a different summarized plurality of records associated with the record type and the particular time interval,
      the different summarized plurality of records include:
         information regarding a different total quantity of records within another group of records,
         the other group records include records associated with the record type and the particular time interval, and
         information regarding a different particular quantity of records, associated with the first indicator, within the other group of records;
   combining, by the first server, the total quantity of records within the group of records with the different total quantity of records within the other group of records to form a combined total quantity of records;
   combining, by the first server, the particular quantity of records associated with the first indicator with the different particular quantity of records associated with the first indicator to form a combined particular quantity of records associated with the first indicator; and
   determining, by the first server, a combined failure rate based on the combined total quantity of records and the combined particular quantity of records; and
   sending information based on the summarized plurality of records and the combined failure rate to a third server.

2. The method of claim 1, further comprising:
   sending the plurality of records to a fourth server to allow a client device to receive the plurality of records from the fourth server independently of the second server.

3. The method of claim 2, where the second server is associated with a party that is different from a party associated with at least one of the first server, the third server, or the fourth server.

4. The method of claim 1, where the market is associated with one or more cellular nodes.

5. The method of claim 1, further comprising:
   determining a threshold based on the failure rate, and
   providing, for the particular record, an indication based on the threshold.

6. A system comprising:
   a first server, comprising a processor, to:
      receive a plurality of records from a second server,
         a particular record, of the plurality of records, including information identifying a record type and a timestamp;
      summarize the plurality of records to obtain a summarized plurality of records,
         when summarizing the plurality of records, the first server is to:
            identify a group of records,
               the group of records including the particular record and one or more other records, of the plurality of records, associated with the record type and a particular time interval, and
               the timestamp identifying a time associated with the particular time interval,
            determine a total quantity of records associated with the group of records,
            determine a particular quantity of records, associated with an indicator, within the group of records, and
            determine a failure rate associated with the group of records based on the total quantity of records associated with the group of records and the particular quantity of records associated with the indicator;
      identify a different summarized plurality of records associated with the record type and the particular time interval,
         the different summarized plurality of records including:
            information regarding a different total quantity of records within another group of records, the other group records include records associated with the record type and the particular time interval, and information regarding a different particular quantity of records, associated with the indicator, within the other group of records;

combine the total quantity of records within the group of records with the different total quantity of records within the other group of records to form a combined total quantity of records;

combine the particular quantity of records associated with the indicator with the different particular quantity of records associated with the indicator to form a combined particular quantity of records associated with the indicator;

determine a combined failure rate based on the combined total quantity of records and the combined particular quantity of records; and provide information based on the combined failure rate.

7. The system of claim 6, where the second server is associated with a party that is different from a party associated with the first server.

8. The system of claim 6, where the group of records and other group of records are further associated with one or more cellular nodes.

9. The system of claim 6, where the group of records and the other group of records include information identifying a particular market and are associated with the particular market.

10. A method comprising:

receiving, by a first server, one or more summarized data groups from a second server, a particular summarized data group, of the one or more summarized data groups, including:

information regarding a total quantity of records within a group of records, the group of records including records associated with a particular record type and a particular time interval, and a particular record, in the group of records, having a timestamp associated with the particular time interval, information regarding a particular quantity of records, associated with an indicator, within the group of records, and information regarding a failure rate associated with the group of records based on the total quantity of records associated with the group of records and the particular quantity of records associated with the indicator;

receiving, by the first server and from a third server, a different summarized data group associated with the particular record type and the particular time interval, the different summarized data group including:

information regarding a different total quantity of records within another group of records, the other group of records including records associated with the particular record type and the particular time interval, and information regarding a different particular quantity of records, associated with the indicator, within the other group of records;

combining, by the first server, the total quantity of records within the group of records with the different total quantity of records within the other group of records to form a combined total quantity of records;

combining, by the first server, the particular quantity of records associated with the indicator with the different particular quantity of records associated with the indicator to form a combined particular quantity of records associated with the indicator;

determining, by the first server, a combined failure rate based on the combined total quantity of records and the combined particular quantity of records associated with the indicator; and providing, by the first server, information based on the combined failure rate.

11. The method of claim 10, further comprising:

determining that the failure rate does not satisfy a threshold; and sending an indication to the client device based on determining that the failure rate does not satisfy the threshold.

12. The method of claim 11, further comprising:

determining the threshold based on an average of failure rates from the one or more summarized data groups.

13. The method of claim 11, further comprising:

determining the threshold based on a standard deviation of failure rates from the one or more summarized data groups.

14. The method of claim 11, further comprising:

determining the threshold based on failure rates from the one or more summarized data groups and a multiplier.

15. The method of claim 10, where the records that are included in the particular group of records are further associated with a particular market that is associated with one or more cellular nodes.

16. The method of claim 10, further comprising:

receiving a request from the client device to provide raw data associated with the particular summarized data group; and causing a third server to send the raw data associated with the particular summarized data group to the client device.

17. A system comprising:

a first server, comprising a processor, to:

receive one or more summarized data groups from a second server, a particular summarized data group, of the one or more summarized data groups, including:

information regarding a total quantity of records within a group of records, the group of records including records associated with a particular record type and a particular time interval, and a particular record, in the group of records, having a timestamp associated with the particular time interval, information regarding a particular quantity of records associated with an indicator within the group of records, and information regarding a failure rate associated with the group of records based on the total quantity of records associated with the group of records and the particular quantity of records associated with the indicator;

receive, from a third server, a different summarized data group associated with the particular record type and the particular time interval, the different summarized data group including:

information regarding a different total quantity of records within another group of records, the other group of records including records associated with the particular record type and the particular time interval, and information regarding a different particular quantity of records, associated with the indicator, within the other group of records;

combine the total quantity of records within the group of records with the different total quantity of records within the other group of records to form a combined total quantity of records;

combine the particular quantity of records associated with the indicator with the different particular quantity of records associated with the indicator to form a combined particular quantity of records associated with the indicator;

determine a combined failure rate based on the combined total quantity of records and the combined particular quantity of records associated with the indicator; and provide information based on the combined failure rate.

18. The system of claim 17, where the first server is further to:

determine a threshold based on an average of failure rates associated with the one or more summarized data groups, determine that the failure rate does not satisfy the threshold, and provide an indication based on determining that the failure rate does not satisfy the threshold.

19. The system of claim 17, where the first server is further to:

determine a threshold based on a standard deviation of failure rates associated with the one or more summarized data groups, determine that the failure rate does not satisfy the threshold, and provide an indication based on determining that the failure rate does not satisfy the threshold.

20. The system of claim 17, where the group of records further includes information associated with one or more cellular nodes.

21. A non-transitory computer-readable medium storing instructions, the instructions comprising:

a plurality of instructions which, when executed by one or more processors, cause the one or more processors to:

receive a summarized data group from a server, the summarized data group including:

information regarding a total quantity of records within a group of records, the group of records including records associated with a particular market, a particular record type, and a particular time interval, and a particular record, in the group of records, having a timestamp within the respective time interval, information regarding a particular quantity of records associated with an indicator within the group of records, and information regarding a failure rate associated with the group of records based on the total quantity of records associated with the group of records and the particular quantity of records associated with the indicator;

receive a different summarized data group associated with the particular record type and the particular time interval, the different summarized data group including:

information regarding a different total quantity of records within another group of records, the other group of records including records associated with the particular record type and the particular time interval, and information regarding a different particular quantity of records, associated with the indicator, within the other group of records;

combine the total quantity of records within the group of records with the different total quantity of records within the other group of records to form a combined total quantity of records;

combine the particular quantity of records associated with the indicator with the different particular quantity of records associated with the indicator to form a combined particular quantity of records associated with the indicator; and determine a combined failure rate based on the combined total quantity of records and the combined particular quantity of records associated with the indicator.

22. The non-transitory computer-readable medium of claim 21, where the instructions further comprise:

one or more instructions which, when executed by the one or more processors, cause the one or more processors to:

determine a threshold based on an average of failure rates associated with the summarized data group, and provide an indication based on the threshold.

23. The non-transitory computer-readable medium of claim 21, where the instructions further comprise:

one or more instructions which, when executed by the one or more processors, cause the one or more processors to:

determine a threshold based on a standard deviation of failure rates associated with the summarized data group, and provide an indication based on the threshold.

24. The non-transitory computer-readable medium of claim 21, where the indicator indicates that a completed call terminated without a user device receiving an instruction to terminate the completed call.

* * * * *